US008730830B2

(12) United States Patent
Jeong

(10) Patent No.: US 8,730,830 B2
(45) Date of Patent: May 20, 2014

(54) INDOOR LOCATION MEASURING METHOD AND APPARATUS USING ACCESS POINT

(75) Inventor: Seung-Hyuk Jeong, Seoul (KR)

(73) Assignee: KT Corporation, Seongnam (KR)

( * ) Notice: Subject to any disclaimer, the term of this patent is extended or adjusted under 35 U.S.C. 154(b) by 162 days.

(21) Appl. No.: 13/337,834

(22) Filed: Dec. 27, 2011

(65) Prior Publication Data

US 2012/0195215 A1 Aug. 2, 2012

(30) Foreign Application Priority Data

Jan. 31, 2011 (KR) .................. 10-2011-0009597

(51) Int. Cl.
*H04L 1/00* (2006.01)
(52) U.S. Cl.
USPC .......................................... 370/252
(58) Field of Classification Search
USPC ................. 370/252, 254, 338; 455/456.1
See application file for complete search history.

(56) References Cited

U.S. PATENT DOCUMENTS

| 2005/0176406 | A1  | 8/2005  | Krishnakumar et al. |         |
|--------------|-----|---------|---------------------|---------|
| 2009/0067392 | A1* | 3/2009  | Hart et al.         | 370/338 |
| 2009/0280827 | A1* | 11/2009 | Michaud             | 455/456.1 |
| 2010/0026513 | A1* | 2/2010  | Pandey              | 340/825.36 |
| 2010/0265093 | A1  | 10/2010 | Cho et al.          |         |

FOREIGN PATENT DOCUMENTS

| KR | 20060041702 A | 5/2006 |
| KR | 20060104175 A | 10/2006 |
| KR | 20090059920 A | 6/2009 |
| KR | 20100030349 A | 3/2010 |
| KR | 20110001299 A | 1/2011 |

* cited by examiner

*Primary Examiner* — Chi Pham
*Assistant Examiner* — Fahmida Chowdhury
(74) *Attorney, Agent, or Firm* — Sughrue Mion, PLLC

(57) ABSTRACT

Provided is an indoor location measuring method and apparatus. The indoor location measuring apparatus that measures a location of a communication terminal within a building by determining a floor where the communication terminal is located may include a floor classifying means for classifying information relating to a plurality of access points (APs) and collected by the communication terminal for each floor, and a location determining means for assigning a grade constant to each item of AP information classified for each floor based on the signal intensity included in the AP information, and for calculating the sum of the grade constants for each floor, and for determining a floor having the largest sum as a location of the communication terminal.

14 Claims, 6 Drawing Sheets

FIG.3

| MAC ADDRESS OF AP | ADDRESS | FLOOR | SHOP INFORMATION |
|---|---|---|---|
| 111.111 | SEOCHO-DONG, SEOCHO-GU, SEOUL- | 1st FLOOR | A-MART |
| 111.112 | SEOCHO-DONG, SEOCHO-GU, SEOUL- | 1st FLOOR | A-MART |
| 111.113 | SEOCHO-DONG, SEOCHO-GU, SEOUL- | 1st FLOOR | A-MART |
| 111.114 | SEOCHO-DONG, SEOCHO-GU, SEOUL- | 1st FLOOR | A-MART |
| 111.115 | SEOCHO-DONG, SEOCHO-GU, SEOUL- | 2nd FLOOR | A-MART |
| 111.116 | SEOCHO-DONG, SEOCHO-GU, SEOUL- | 2nd FLOOR | A-MART |
| 111.117 | SEOCHO-DONG, SEOCHO-GU, SEOUL- | 2nd FLOOR | A-MART |
| 111.118 | SEOCHO-DONG, SEOCHO-GU, SEOUL- | 2nd FLOOR | A-MART |
| 111.119 | SEOCHO-DONG, SEOCHO-GU, SEOUL- | 3rd FLOOR | A-MART PARKING LOT |
| 111.120 | SEOCHO-DONG, SEOCHO-GU, SEOUL- | 3rd FLOOR | A-MART PARKING LOT |
| 111.121 | SEOCHO-DONG, SEOCHO-GU, SEOUL- | 3rd FLOOR | A-MART PARKING LOT |
| 111.122 | SEOCHO-DONG, SEOCHO-GU, SEOUL- | 3rd FLOOR | A-MART PARKING LOT |
| ... | ... | ... | ... |

310  320  330  340

INDOOR LOCATION MEASURING METHOD AND APPARATUS USING ACCESS POINT

CROSS-REFERENCE TO RELATED APPLICATION(S)

This application claims priority from Korean Patent Application No. 10-2011-0009597, filed on Jan. 31, 2011 in the Korean Intellectual Property Office, the disclosure of which is incorporated herein by reference in its entirety.

BACKGROUND

1. Field

Exemplary embodiments relate to a technique for measuring an indoor location, and more particularly, to a technique for measuring an indoor location using an access point of a wireless local area network (WLAN) service.

2. Description of the Related Art

With the development of mobile communication techniques, studies have been actively conducted on location measuring techniques that measure a location of a mobile terminal in a communication network. Typically, a global positioning system (GPS)-based location measuring technique using satellites has been widely employed.

The GPS-based location measuring technique has a disadvantage of requiring that a GPS receiver be mounted on a mobile terminal. Also, because the GPS-based location measuring technique was developed by the U.S. Department of Defense for military use, a high-precision GPS-based location measuring technique is not publicly disclosed.

Furthermore, the GPS-based location measuring technique has limited use, because the GPS-based location measuring technique cannot be employed in many buildings, such as, for example, houses, offices, or shops, where satellite signals cannot be received. To overcome these drawbacks, attempts have been made to measure a location of a terminal using an access point of a WLAN service.

The WLAN service enables users of mobile terminals to wirelessly connect to the Internet through a WLAN access point near the mobile terminals, such as, for example, laptop computers, personal digital assistants (PDAs), smart phones, and the like, that have WLAN cards mounted therein. Recently, to meet the increasing demand for the WLAN service, installations of access points in buildings, such as large-scale shopping malls, and the like, have increased.

Because many access points have now been installed in buildings, a location of a mobile terminal can be measured by using the access points in buildings where a GPS-based location measuring technique could not otherwise be applied.

Accordingly, research and development on a location measuring technique using an access point of a WLAN service has recently been flourishing.

SUMMARY

Aspects of the exemplary embodiments are directed to providing an indoor location measuring method and apparatus for measuring a location of a subscriber within a building using an access point.

Also, aspects of the exemplary embodiments are directed to providing an indoor location measuring method and apparatus for determining a floor where a subscriber is located within a building.

Additional aspects will be set forth in the following description, and in part will be apparent from the exemplary embodiments set forth, or may be learned by practice.

In one aspect of the exemplary embodiments, provided is an indoor location measuring apparatus that measures a location of a communication terminal within a building by determining a floor where the communication terminal is located, including a floor classifying means for classifying information relating to a plurality of access points (APs) and collected by the communication terminal for each floor, and a location determining means for assigning a grade constant to each item of AP information classified for each floor based on the signal intensity included in the AP information, and for calculating the sum of the grade constants for each floor, and for determining a floor having the largest sum as a location of the communication terminal.

In another aspect of the exemplary embodiments, provided is an indoor location measuring method that includes determining a floor where a communication terminal is located within a building by using a location measuring apparatus. The method includes classifying information relating to a plurality of APs and collected by the communication terminal for each floor, assigning a grade constant to each item of AP information classified for each floor based on the signal intensity included in the AP information, calculating the sum of the grade constants for each floor, and determining a floor having the largest sum as a location of the communication terminal.

In still another aspect of the exemplary embodiments, provided is an indoor location measuring method that includes determining location information of a subscriber by using a location measuring system provided with a database storing installation information of each AP. The method includes receiving a request for location information relating to a first communication terminal from a second communication terminal, receiving information relating to a plurality of APs and collected by the first communication terminal from the first communication terminal, classifying the information relating to the plurality of APs for each floor by referring to the installation information of the database, assigning a grade constant to each item of AP information classified for each floor based on the signal intensity included in the AP information, calculating the sum of the grade constants for each floor, determining a floor having the largest sum as a location of the first communication terminal, and providing the determined floor information to the second communication terminal.

BRIEF DESCRIPTION OF THE DRAWINGS

FIG. 3 is an access point table according to an exemplary embodiment.

Figure 1:
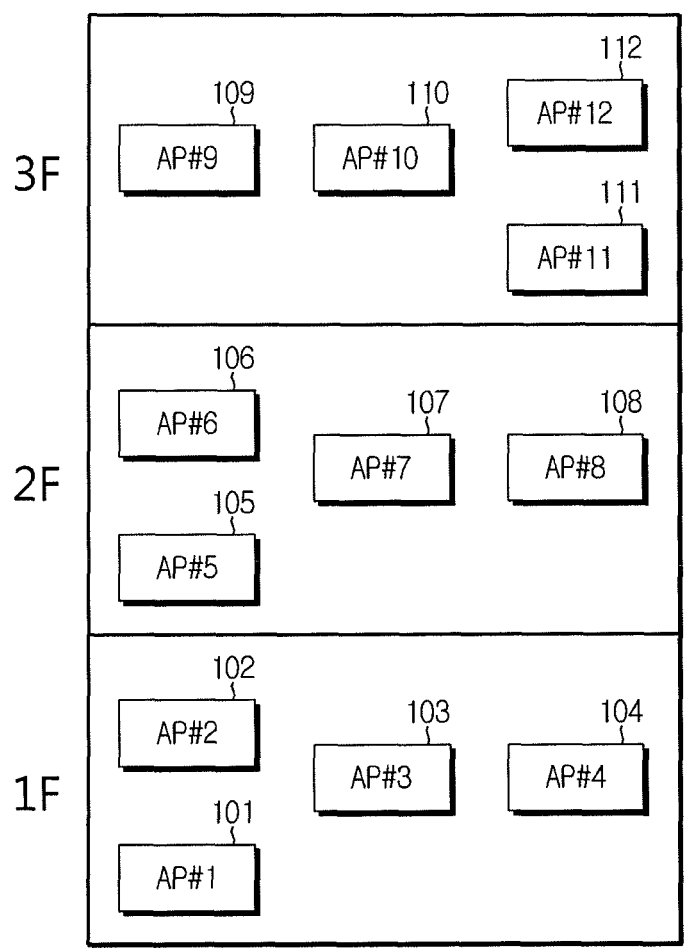
FIG. 1 is a diagram illustrating an indoor communication environment according to an exemplary embodiment.

Throughout the drawings and the detailed descriptions, unless otherwise described, the same drawing reference numerals will be understood to refer to the same elements, features, and structures. The relative size and depiction of these elements may be exaggerated for clarity, illustration, and convenience.

DETAILED DESCRIPTION OF EXEMPLARY EMBODIMENTS

The following detailed description is provided to assist the reader in gaining a comprehensive understanding of the methods, apparatuses, and/or systems described herein. Accordingly, various changes, modifications, and equivalents of the systems, apparatuses and/or methods described herein will be apparent to those of ordinary skill in the art. Also, descriptions of well-known functions and constructions may be omitted for increased clarity and conciseness.

FIG. 1 is a diagram illustrating an indoor communication environment according to an exemplary embodiment.

Referring to FIG. 1, a plurality of access points (APs) AP#1 101, AP#2 102, AP#3 103, AP#4 104, AP#5 105, AP#6 106, AP#7 107, AP#8 108, AP#9 109, AP#10 110, AP#11 111, and AP#12 112 are installed in a building, such as, for example, a house, an office, a shopping mall, and the like, to provide an Internet service using a wireless local area network (WLAN) system, such as, for example, Wireless Fidelity (WiFi). A communication terminal may use an Internet service by connecting to a wired Internet network via at least one of the APs 101 to 112 (i.e., AP#1~AP#12).

Generally, each of the APs 101 to 112 (AP#1~AP#12) providing an Internet service using a WLAN system provides coverage of only several meters in radius. The APs 101 to 112 (AP#1~AP#12) are often installed in large numbers at various places due to the relatively low cost associated with purchasing and installing an AP. Also, each of the APs 101 to 112 (AP#1~AP#12) emits radio signals, including its respective MAC address, in a continuous manner, to induce a connection of the communication terminal. Typically, the APs are installed on each floor of a building. For example, as shown in FIG. 1, AP#1 101, AP#2 102, AP#3 103, and AP#4 104 are installed on the first floor 1F; AP#5 105, AP#6 106, AP#7 107, and AP#8 108 are installed on the second floor 2F; and AP#9 109, AP#10 110, AP#11 111, and AP#12 112 are installed on the third floor 3F.

By using the APs 101 to 112 (AP#1~AP#12) installed on each floor, it is possible to recognize a floor at which a subscriber is located within the building. Accordingly, location measurement performed by using the APs 101 to 112 (AP#1~AP#12) can yield a more accurate result than the conventional location measurement using GPS coordinates.

However, when a plurality of the APs 101 to 112 (AP#1~AP#12) are installed on each floor as shown in FIG. 1, a radio signal from an AP installed on a particular floor may reach another floor. This phenomenon frequently occurs near a window of the building. In particular, a communication terminal of a subscriber located on a particular floor may detect information emitted from one or more of the APs 101 to 112 (AP#1~AP#12) installed on other floors as well as information emitted from one or more of the APs 101 to 112 (AP#1~AP#12) installed on the particular floor. For example, when the communication terminal is located on the second floor, the communication terminal may receive information emitted from one or more of the APs 101 to 104 (AP#1~AP#4) and APs 109 to 112 (AP#9~AP#12) installed on the first and third floors, respectively, as well as information emitted from one or more of the APs 105 to 108 (AP#5~AP#8) installed on the second floor.

To correctly determine a floor where the communication terminal is located within the building, the signal intensity of each AP 101 to 112 (AP#1~AP#12) may be represented as a grade constant that may be used in recognizing a floor where the subscriber is currently located, as described below. For example, the signal intensity may be expressed as a received signal strength indicator (RSSI) of each AP 101 to 112 (AP#1~AP#12) detected by the communication terminal or an indoor location measuring apparatus.

Figure 2:
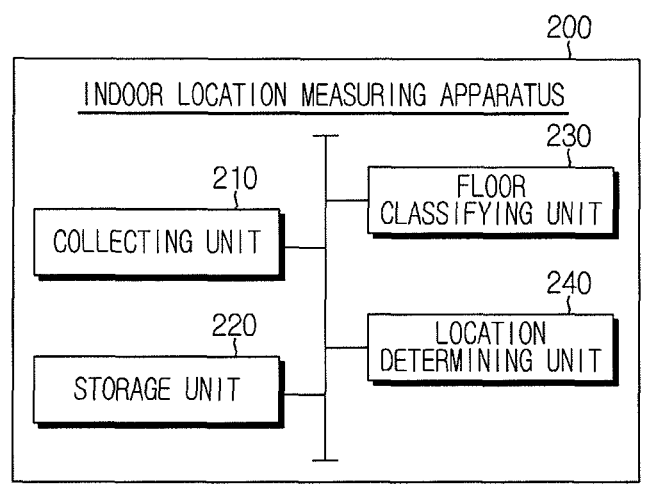
FIG. 2 is a block diagram illustrating a configuration of an indoor location measuring apparatus according to an exemplary embodiment.

FIG. 2 is a block diagram illustrating a configuration of an indoor location measuring apparatus according to an exemplary embodiment.

Referring to FIG. 2, an indoor location measuring apparatus 200 according to an exemplary embodiment includes a collecting unit 210, a storage unit 220, a floor classifying unit 230, and a location determining unit 240.

The collecting unit 210 may collect information relating to each AP 101 to 112 (AP#1~AP#12), including the signal intensity and identification information such as, for example, a Media Access Control (MAC) address, which is detected in an area where a subscriber is located.

The storage unit 220 may store information relating to each AP 101 to 112 (AP#1~AP#12), including, for example, a MAC address, and a street address, floor information and shop information where each AP 101 to 112 (AP#1~AP#12) is installed, in the form of a table. Accordingly, the storage unit 220 may store installation information relating to each AP 101 to 112 (AP#1~AP#12).

FIG. 3 is an AP table according to an exemplary embodiment.

As shown in FIG. 3, an AP table according to an exemplary embodiment may include a MAC address field 310, an address field 320, a floor field 330, and a shop information field 340 for each AP 101 to 112 (AP#1~AP#12).

The MAC address field 310 may record a MAC address of each AP 101 to 112 (AP#1~AP#12).

The address field 320 may record a street address of each AP 101 to 112 (AP#1~AP#12).

The floor field 330 may record a floor (for example, first floor, second floor, and the like) where each AP 101 to 112 (AP#1~AP#12) is installed.

The shop information field 340 may record the name of a shop where each AP 101 to 112 (AP#1~AP#12) is installed.

The floor classifying unit 230 may identify a MAC address of each respective AP 101 to 112 (AP#1~AP#12) collected by the collecting unit 210, search the AP table for respective floor information mapped to the corresponding MAC address, determine a floor where an AP having the corresponding MAC address is installed, and group information (that is, a respective MAC address and the corresponding signal intensity) of each of the APs 101 to 112 (AP#1~AP#12) which are installed on the same floor. In particular, the floor classifying unit 230 may compare AP information collected by the collecting unit 210 with the AP table of the storage unit 220, determine a floor where each AP 101 to 112 (AP#1~AP#12) is installed, and group AP information by floor, based on a determination that each AP within a particular subset of APs is installed on the same floor.

The location determining unit 240 may check each respective signal intensity included in the grouped AP information and assign a grade constant to each respective item of AP information by referring to Table 1 below.

TABLE 1

| AP Signal Intensity Range | Grade Constant |
| --- | --- |
| −56 dB or above | 16 |
| −57 dB~−70 dB | 8 |

TABLE 1-continued

| AP Signal Intensity Range | Grade Constant |
|---|---|
| −71 dB∼−80 dB | 4 |
| −81 dB∼−90 dB | 2 |
| −91 dB or below | 1 |

Table 1 shows an exemplary set of grade constants to be assigned based on a corresponding signal intensity range. By referring to Table 1, the location determining unit 240 may assign a differential grade constant to each respective item of AP information based on the respective detected signal intensity of each of the APs 101 to 112 (AP#1~AP#12).

In particular, the grade constant is a value which is assigned differentially based on the respective signal intensity of each of the APs 101 to 112 (AP#1~AP#12). The location determining unit 240 may assign a larger grade constant to an item of AP information indicating a higher signal intensity and a smaller grade constant to an item of AP information indicating a lower signal intensity. For example, a grade constant of '16' is assigned to AP information indicating a relatively high signal intensity of −56 dB or above, and a grade constant '1' is assigned to AP information indicating a relatively low signal intensity of −91 dB or below. The grade constant is not fixed, and may vary depending on the operation of an operator at any time.

As described above, the grade constant is differentially applied so as to assign a smaller grade constant to items of AP information received from other floors and a larger grade constant to items of AP information received from a same floor.

Also, the location determining unit 240 may calculate the sum of the grade constants for each floor and determine a floor having the largest sum as a floor where the corresponding subscriber is located.

The indoor location measuring apparatus 200 of the above structure may be mounted in a communication terminal of the subscriber. In this case, the indoor location measuring apparatus 200 may directly measure a location of the communication terminal. Alternatively, the indoor location measuring apparatus 200 may be incorporated as a separate device. In this case, the indoor location measuring apparatus 200 may receive information relating to each of a plurality of APs collected by a communication terminal to be used to measure a relative location of each of the plurality of APs with respect to the communication terminal, determine a floor where each respective AP is located, and provide the respective floor information for each of the plurality of APs to the communication terminal.

Figure 4:
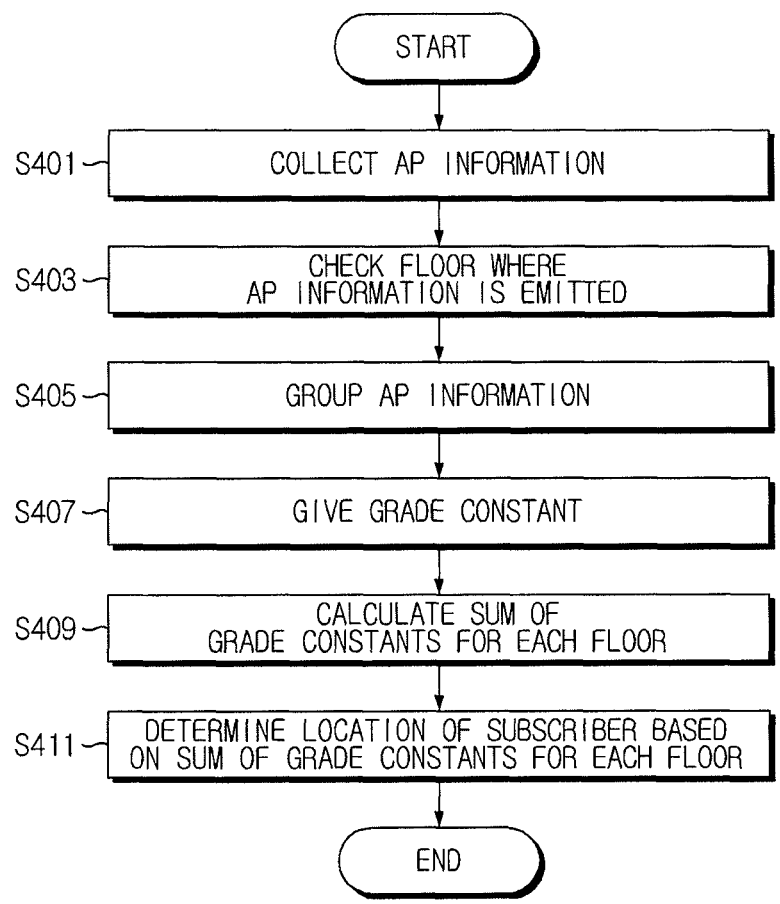
FIG. 4 is a flowchart illustrating a method for measuring a location of a subscriber by using an indoor location measuring apparatus according to an exemplary embodiment.

FIG. 4 is a flowchart illustrating a method for determining a location of a subscriber by the indoor location measuring apparatus 200 according to an exemplary embodiment.

Referring to FIG. 4, in operation S401, the collecting unit 210 collects information relating to each of a plurality of APs 101 to 112 (AP#1~AP#12) detected in an area where a subscriber is located. For example, the collecting unit 210 may collect MAC addresses and radio signal intensities of each of the APs 101 to 112 (AP#1~AP#12). In this instance, when the indoor location measuring apparatus 200 is mounted in a communication terminal of the subscriber, the collecting unit 210 may directly collect information relating to each of the APs 101 to 112 (AP#1~AP#12). Alternatively, when the indoor location measuring apparatus 200 is incorporated as a separate device, the collecting unit 210 may receive information relating to each of the APs 101 to 112 (AP#1~AP#12) collected by the communication terminal of the subscriber from the communication terminal.

After collection of AP information by the collecting unit 210 is completed, in operation S403, the floor classifying unit 230 checks a floor where the AP information is emitted. For example, the floor classifying unit 230 may identify a MAC address of each AP 101 to 112 (AP#1~AP#12) in each respective item of the AP information. Also, the floor classifying unit 230 may search the AP table stored by the storage unit 220 for each of the identified MAC addresses, and then use a result of the search to check respective floors where corresponding AP information are emitted. That is, the floor classifying unit 230 may determine a respective floor mapped to each of the collected MAC addresses in the AP table stored by the storage unit 220.

In operation S405, the floor classifying unit 230 groups AP information determined to be emitted from a same floor. For example, referring to FIG. 3, the floor classifying unit 230 may group AP information which includes the MAC addresses '111.111', '111.112', '111.113', and '111.114', and separately group AP information which includes the MAC addresses '111.115', '111.116', '111.117', and '111.118'.

After grouping of AP information is completed, in operation S407, the location determining unit 240 uses the respective signal intensities included in the grouped AP information to assign a grade constant to each item of AP information, for example, by referring to Table 1. In operation S409, the location determining unit 240 calculates the sum of the grade constants for each floor, and in operation S411, determines a floor having the largest sum as a floor where the corresponding subscriber is located.

Referring to FIG. 1, in an exemplary scenario, it is assumed that the radio signal intensities from AP#1 101, AP#2 102, AP#3 103, and AP#4 104 belonging in a first floor group are −71 dB, −73 dB, −91 dB, and −93 dB, respectively; the radio signal intensities from AP#5 105, AP#6 106, AP#7 107, and AP#8 108 belonging in a second floor group are −56 dB, −56 dB, −80 dB, and −85 dB, respectively; and the radio signal intensities from AP#9 109, AP#10 110, AP#11 111, and AP#12 112 belonging in a third floor group are −71 dB, −73 dB, −93 dB, and −98 dB, respectively.

Using this exemplary scenario, the location determining unit 240 may calculate, by referring to Table 1, the sum of the grade constants of the first floor group as 4+4+1+1=10, the sum of the grade constants of the second floor group as 16+16+2+2=36, and the sum of the grade constants of the third floor group as 4+4+1+1=10. Also, the location determining unit 240 may observe that the second floor group has the largest sum of the grade constants and therefore determine that the subscriber is located on the second floor.

When the location of the subscriber is determined, the location determining unit 240 may display the determined floor information on a screen of the communication terminal of the subscriber or transmit the determined floor information to the communication terminal, to provide the subscriber with the current location information. In particular, when the indoor location measuring apparatus 200 is mounted in the communication terminal of the subscriber, the location determining unit 240 may display the determined floor information on a screen of the communication terminal. Alternatively, when the indoor location measuring apparatus 200 is incorporated as a separate device, the location determining unit 240 may transmit the determined floor information to the communication terminal. Preferably, the location determining unit 240 may search the AP table stored by the storage unit 220 for shop information and address information mapped to the determined floor information. Accordingly, the location determining unit 240 may additionally display the found shop information and address information on a screen of the communication terminal or additionally transmit the found shop information and address information to the communication terminal, to provide the subscriber with an address of the building, shop information and floor information relating to where the subscriber is currently located.

Also, the indoor location measuring apparatus 200 may provide the information to another subscriber that has requested a location measurement with an address of the building, shop information and floor information, where the corresponding subscriber is currently located. In particular, when location measurement is requested by another person, such as, for example, a parent, a friend, and the like, the indoor location measuring apparatus 200 may measure a location of the corresponding subscriber by using the method illustrated in FIG. 4 and provide the measured information (that is, building address, shop information, and floor information) to the other person that has requested a location measurement.

Hereinafter, an indoor location measuring system according to another exemplary embodiment is described below.

Figure 5:
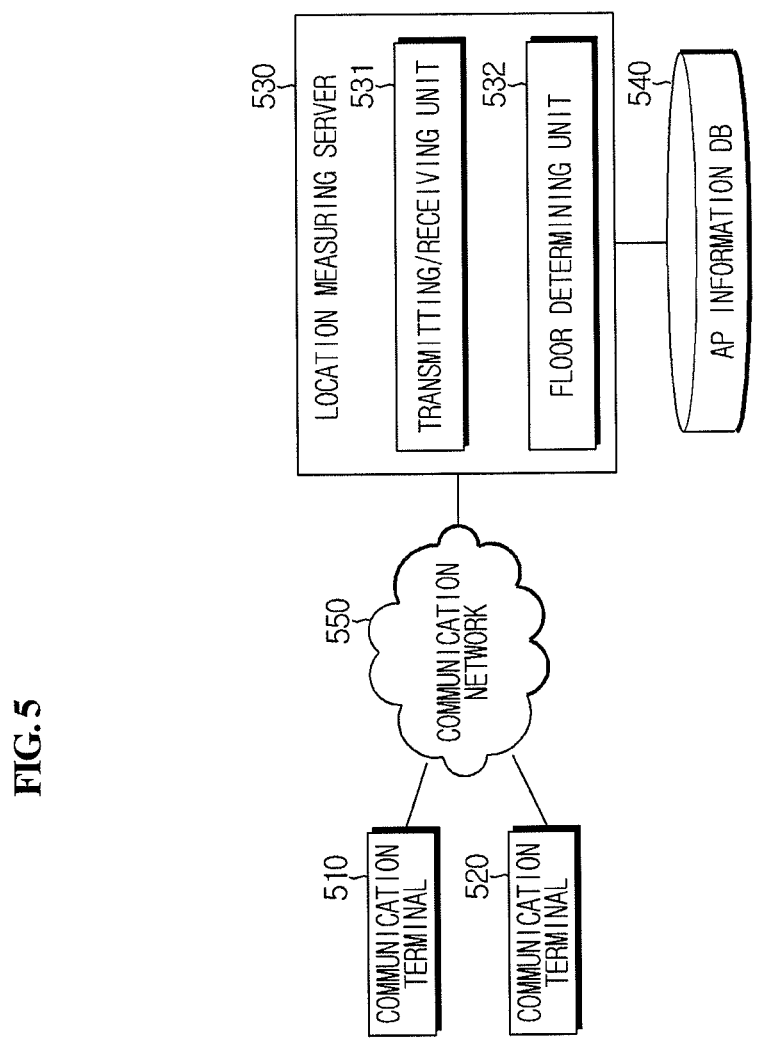
FIG. 5 is a block diagram illustrating a configuration of an indoor location measuring system according to another exemplary embodiment.

FIG. 5 is a block diagram illustrating a configuration of an indoor location measuring system according to another exemplary embodiment.

As shown in FIG. 5, an indoor location measuring system according to another exemplary embodiment includes communication terminals 510 and 520, a location measuring server 530, and an access point information database (hereinafter referred to as an "AP information DB") 540. The communication terminals 510 and 520 and the location measuring server 530 may transmit and receive data via a communication network 550.

The communication network 550 may include any type of communication network supporting a communication between the communication terminals 510 and 520 and the location measuring server 530, such as, for example, a wired communication network or a wireless communication network.

The communication terminals 510 and 520 are articles to be used for location measurements, and may transmit information relating to a plurality of APs 101 to 112 (AP#1~AP#12) detected at their current positions to the location measuring server 530 to enable the location measuring server 530 to determine the locations of the communication terminals 510 and 520. The AP information may include a MAC address and the signal intensity of a corresponding AP. The communication terminals 510 and 520 may include any types of devices which are capable of communicating with the APs 101 to 112 (AP#1~AP#12), for example, mobile phones, laptop computers, smart phones, navigators, and the like.

The AP information DB 540 may store information relating to each AP 101 to 112 (AP#1~AP#12), such as, for example, a MAC address, and a street address, floor information, and shop information where each AP 101 to 112 (AP#1~AP#12) is installed, in the form of a table, as shown in FIG. 3. Accordingly, the AP information DB 540 may store installation information relating to each AP 101 to 112 (AP#1~AP#12).

The location measuring server 530 includes a transmitting/receiving unit 531 and a floor determining unit 532.

The transmitting/receiving unit 531 may communicate with each of the communication terminals 510 and 520 via the communication network 550.

The floor determining unit 532 may determine a location of each of the communication terminals 510 and 520 based on the information relating to a plurality of the APs 101 to 112 (AP#1~AP#12) received from the communication terminals 510 and 520.

Specifically, the floor determining unit 532 may identify a MAC address of each AP 101 to 112 (AP#1~AP#12) contained in the AP information received through the transmitting/receiving unit 531, and search the AP table stored by the AP information DB 540 for floor information mapped to the MAC addresses. Also, the floor determining unit 532 may group information (for example, a MAC address of a particular AP and the corresponding signal intensity) of APs 101 to 112 (AP#1~AP#12) located on the same floor based on the search result. Also, the floor determining unit 532 may check the respective signal intensity included in the grouped AP information and assign a grade constant to each item of AP information, for example, by referring to Table 1. Also, the floor determining unit 532 may calculate the respective sums of the grade constants for each floor and determine a floor having the largest sum as a floor where each of the communication terminals 510 and 520 is located.

Figure 6:
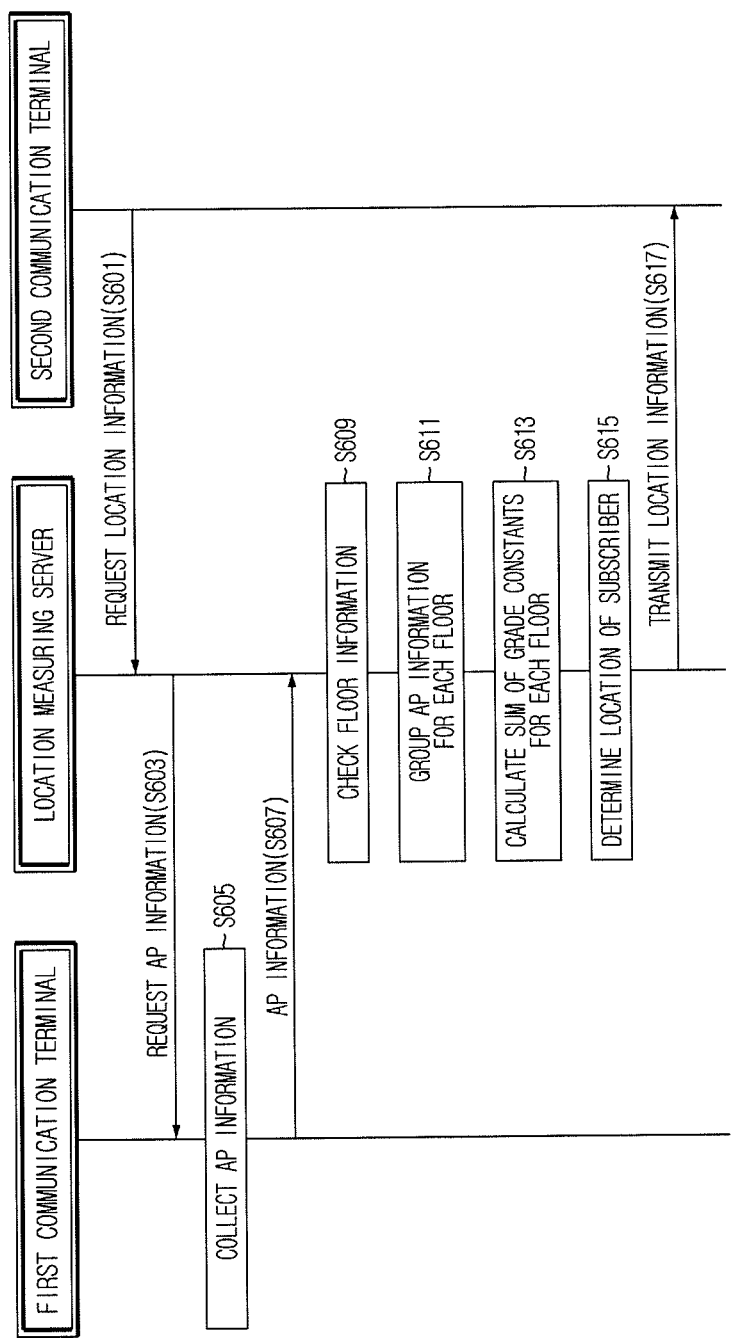
FIG. 6 is a flowchart illustrating a method for measuring a location of a subscriber by using an indoor location measuring system according to another exemplary embodiment.

FIG. 6 is a flowchart illustrating a method for determining a location of a subscriber by the indoor location measuring system according to another exemplary embodiment.

Hereinafter, the communication terminal 510 of FIG. 5 is referred to as a first communication terminal and the communication terminal 520 is referred to as a second communication terminal. In particular, the first communication terminal 510 is an article to be used for location measurement, and the second communication terminal 520 is an article that receives a request for information relating to a location of the first communication terminal 510.

Referring to FIG. 6, in operation S601, the second communication terminal 520 transmits a location information request message, including a request for identity information (such as, for example, an international mobile subscriber identity (IMSI) or a telephone number) relating to the first communication terminal 510 to the location measuring server 530.

In operation S603, the location measuring server 530 transmits an AP information request message to the first communication terminal 510. In this instance, the location measuring server 530 may transmit the identity information relating to the first communication terminal 510 to a location management server (for example, a home location register (HLR) (not shown)) to obtain information relating to an access channel of the first communication terminal 510, and may transmit the message to the first communication terminal 510 via the access channel of the first communication terminal 510.

In operation S605, the first communication terminal 510 collects information relating to APs 101 to 112 (AP#1~AP#12) detected at a current position, in response to the AP information request message received from the location measuring server 530. For example, the first communication terminal 510 may collect a respective MAC address and the corresponding signal intensity for each AP 101 to 112 (AP#1~AP#12) detected at a current position.

In operation 5607, the first communication terminal 510 transmits the collected information relating to each of a plurality of the APs 101 to 112 (AP#1~AP#12) to the location measuring server 530. In operation S609, the floor determining unit 532 of the location measuring server 530 extracts the MAC address from the received AP information and uses the extracted MAC address to check floor information mapped to each MAC address in the AP information DB 540. In operation S611, the floor determining unit 532 groups AP information having the same floor information.

In operation S613, the floor determining unit 532 uses the respective signal intensity included in the grouped AP information to assign a grade constant to each item of AP information, for example, by referring to Table 1, and then calculates the sum of the grade constants for each floor. In operation S615, the floor determining unit 532 determines a floor having the largest sum as a floor where the first communication terminal 510 is located. Also, the floor determining unit 532 may additionally extract address information and shop information mapped to the determined floor from the AP information DB 540.

In operation S617, the floor determining unit 532 transmits the determined floor information, the shop information, and the address information mapped to the floor information to the second communication terminal 520 through the transmitting/receiving unit 531. Then, a subscriber of the second communication terminal 520 may recognize the indoor location of a subscriber of the first communication terminal 510 through the received information.

According to the description provided above, the exemplary embodiments may achieve a precise indoor location measurement by determining a floor where a subscriber is located within a building.

In particular, the exemplary embodiments may be used to correctly determine a floor where a subscriber is located within a building, by assigning a relatively small grade constant to AP information received from other floors and a relatively large grade constant to AP information received from the same floor, and when AP information emitted from other floors is detected, by filtering off the AP information using a floor classifying algorithm based on the grade constant.

Also, the exemplary embodiments may improve the utility of location measurement by providing a user with a building address and shop information as well as with floor information of a terminal to be measured for its location.

A method of one or more exemplary embodiments may be recorded in one or more non-transitory computer-readable media (such as, for example, a compact disk-read only memory (CD ROM), random access memory (RAM), read-only memory (ROM), floppy disks, hard disks, magneto-optical disks, and the like) including program instructions to implement various operations which are executable by a computer.

While this specification contains many features, the features should not be construed as limitations on the scope of the disclosure or of the appended claims. Certain features described in the context of separate exemplary embodiments can also be implemented in combination. Conversely, various features described in the context of a single exemplary embodiment can also be implemented in multiple exemplary embodiments separately or in any suitable subcombination.

Although the drawings describe the operations in a specific order, one should not interpret that the operations are performed in a specific order as shown in the drawings or successively performed in a continuous order, or all the operations are performed to obtain a desired result. Multitasking or parallel processing may be advantageous under any environment. Also, it should be understood that all exemplary embodiments do not require the distinction of various system components made in this description. The program components and systems may be generally implemented as a single software product or multiple software product packages.

A number of examples have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. An indoor location measuring apparatus that determines a floor within a building where a communication terminal is located, the apparatus comprising:
 a floor classifying means for classifying information relating to each of a plurality of access points (APs) collected by the communication terminal based on the floor at which the respective AP resides, the information including a signal intensity for each of the plurality of APs; and
 a location determining means for assigning a grade constant to each of the plurality of APs based on the respective signal intensity included in the information relating to the corresponding AP, wherein the location determining means is operable to calculate a sum of the grade constants for each floor, and to determine a floor associated with a largest sum as a location of the communication terminal,
 wherein the location determining means is further operable to extract shop information of at least one AP, the shop information relating to the floor associated with the largest sum from a storage means, and to provide the extracted shop information and the determined floor information to a subscriber that requests information relating to a location measurement.

2. The indoor location measuring apparatus according to claim 1, further comprising:
 the storage means for storing installation information relating to each respective AP, wherein the floor classifying means is further operable to classify the information relating to each of the plurality of APs by using the installation information relating to the corresponding AP.

3. The indoor location measuring apparatus according to claim 1,
 wherein the location determining means is further operable to assign a grade constant to each AP such that if a signal intensity of a first AP is greater than a signal intensity of a second AP, the grade constant assigned to the first AP is greater than or equal to the grade constant assigned to the second AP.

4. An indoor location measuring method for using a location measuring apparatus to determine a floor where a communication terminal is located within a building, the method comprising:
 classifying information relating to each of a plurality of access points (APs) collected by the communication terminal based on the floor at which the respective AP resides, the information including a signal intensity for each of the plurality of APs;
 assigning a grade constant to each of the plurality of APs based on the respective signal intensity included in the information relating to the corresponding AP;
 calculating a sum of the grade constants for each floor;
 determining a floor associated with the largest sum as a location of the communication terminal;
 retrieving shop information at least one AP, the shop information relating to the floor determined to be associated with the largest sum associated with a stored installation information; and providing the retrieved shop information and information relating to the floor determined as the location of the communication terminal to a subscriber that requests information relating to a location measurement.

5. The indoor location measuring method according to claim 4, further comprising:
storing the installation information relating to each respective AP,
wherein the classifying includes classifying the information relating to each of the plurality of APs by using the stored installation information relating to the corresponding AP.

6. The indoor location measuring method according to claim 4,
wherein assigning a grade constant includes assigning a grade constant to each AP such that if a signal intensity of a first AP is greater than a signal intensity of a second AP, the grade constant assigned to the first AP is greater than or equal to the grade constant assigned to the second AP.

7. An indoor location measuring method for determining location information relating to a subscriber by using a location measuring system, the system including a database storing installation information of each of a plurality of access points (APs), the method comprising:
receiving a request for location information relating to a first communication terminal from a second communication terminal;
receiving information relating to each of the plurality of APs collected by the first communication terminal from the first communication terminal, the information including a signal intensity for each of the plurality of APs;
classifying the received information based on a floor at which the respective AP resides by using the installation information stored by the database;
assigning a grade constant to each of the plurality of APs based on the respective signal intensity included in the received information relating to the corresponding AP;
calculating a sum of the grade constants for each floor, determining a floor associated with a largest sum as a location of the first communication terminal, and providing information relating to the determined floor to the second communication terminal; and
searching the database for shop information of at least one AP, the shop information relating to the determined floor, and transmitting the shop information found as a result of the searching to the second communication terminal.

8. The indoor location measuring method according to claim 7,
wherein assigning a grade constant includes assign a grade constant to each AP such that if a signal intensity of a first AP is greater than a signal intensity of a second AP, the grade constant assigned to the first AP is greater than or equal to the grade constant assigned to the second AP.

9. An apparatus for determining a floor location of a communication terminal within a building, comprising a processor and a transceiver coupled to the processor,
wherein the transceiver is configured to receive information collected by the communication terminal from each of a plurality of access points (APs), the received information including a signal intensity associated with each of the plurality of APs; and
wherein the processor is configured to:
classify the received information based on a floor at which each of the respective APs resides;
assign a grade constant to each of the plurality of APs based on the respective signal intensity associated with the corresponding AP;
calculate a sum of grade constants for each floor; and
determine a floor associated with a largest sum as the floor location of the communication terminal,
the apparatus further comprising a memory coupled to the processor and configured to store installation information relating to each of the plurality of APs, wherein the installation information includes at least one from among a street address at which the respective AP is installed and shop information of the AP, relating to where the respective AP is installed.

10. The apparatus of claim 9, wherein, when the transceiver receives a request for information relating to the determined floor, the transceiver is further configured to transmit installation information relating to at least one of the plurality of APs which is installed on the determined floor.

11. The apparatus of claim 9, wherein each of a predetermined set of grade constants is associated with a corresponding range from within a predetermined set of ranges of signal intensities, and wherein the processor is further configured to assign a grade constant to each of the plurality of APs by selecting a grade constant from the predetermined set of grade constants based on the corresponding range within which the signal intensity associated with the respective AP falls.

12. A method for determining a floor location of a communication terminal within a building, comprising:
receiving information collected by the communication terminal from each of a plurality of access points (APs), the received information including a signal intensity associated with each of the plurality of APs;
classifying the received information based on a floor at which each of the respective APs resides;
assigning a grade constant to each of the plurality of APs based on the respective signal intensity associated with the corresponding AP;
calculating a sum of grade constants for each floor; and
determining a floor associated with a largest sum as the floor location of the communication terminal; and
storing installation information relating to each of the plurality of APs, wherein the installation information includes at least one from among a street address at which the respective AP is installed and shop information of the AP, relating to where the respective AP is installed.

13. The method of claim 12, wherein, when a request for information relating to the determined floor is received, the method further comprises transmitting, in response to the request, installation information relating to at least one of the plurality of APs which is installed on the determined floor.

14. The method of claim 12, further comprising associating each of a predetermined set of grade constants with a corresponding range from within a predetermined set of ranges of signal intensities, and wherein assigning a grade constant to each of the plurality of APs further comprises selecting a grade constant from the predetermined set of grade constants based on the corresponding range within which the signal intensity associated with the respective AP falls.

* * * * *